(12) United States Patent
Bove, Jr. et al.

(10) Patent No.: US 9,483,021 B2
(45) Date of Patent: Nov. 1, 2016

(54) METHODS AND APPARATUS FOR HOLOGRAPHIC ANIMATION

(71) Applicant: Massachusetts Institute of Technology, Cambridge, MA (US)

(72) Inventors: Victor Michael Bove, Jr., Wrentham, MA (US); Daniel Smalley, Cambridge, MA (US); Quinn Smithwick, Glendale, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 347 days.

(21) Appl. No.: 13/842,770

(22) Filed: Mar. 15, 2013

(65) Prior Publication Data

US 2013/0215485 A1   Aug. 22, 2013

Related U.S. Application Data

(63) Continuation-in-part of application No. 12/871,041, filed on Aug. 30, 2010, now abandoned.

(51) Int. Cl.
| | |
|---|---|
| *G03H 1/30* | (2006.01) |
| *G03H 1/04* | (2006.01) |
| *G03H 1/26* | (2006.01) |
| *G03H 1/22* | (2006.01) |

(52) U.S. Cl.
CPC .............. *G03H 1/30* (2013.01); *G03H 1/0486* (2013.01); *G03H 1/2645* (2013.01); *G03H 2001/2273* (2013.01); *G03H 2222/34* (2013.01); *G03H 2222/46* (2013.01); *G03H 2223/12* (2013.01)

(58) Field of Classification Search
CPC .......... G03H 1/24; G03H 1/202; G03H 1/20; G03H 1/30
USPC ............. 359/22, 23, 32, 12, 9, 35, 10; 353/7
See application file for complete search history.

(56) References Cited

U.S. PATENT DOCUMENTS

| | | | |
|---|---|---|---|
| 3,547,510 A * | 12/1970 | De Bitetto | ........................ 359/9 |
| 4,498,729 A * | 2/1985 | Benton | .................... G03H 1/24 359/10 |
| 5,191,449 A * | 3/1993 | Newswanger | .................. 359/22 |
| 6,874,891 B1 | 4/2005 | Fleming | |
| 2005/0190418 A1 | 9/2005 | Kremen | |
| 2007/0268536 A1 | 11/2007 | Holmes et al. | |

* cited by examiner

*Primary Examiner* — Audrey Y Chang
(74) *Attorney, Agent, or Firm* — Stephen R. Otis

(57) ABSTRACT

In an illustrative implementation of this invention, an animated holographic display is created as follows: Multiple HPO holograms in the shape of horizontal strips are recorded on an H2 medium. These horizontal strips are vertically displaced from each other. An animated real image is displayed by sequentially illuminating these HPO holograms. In illustrative implementations of this invention, the vertical perspective of at least some adjacent HPO stripes are identical.

19 Claims, 7 Drawing Sheets

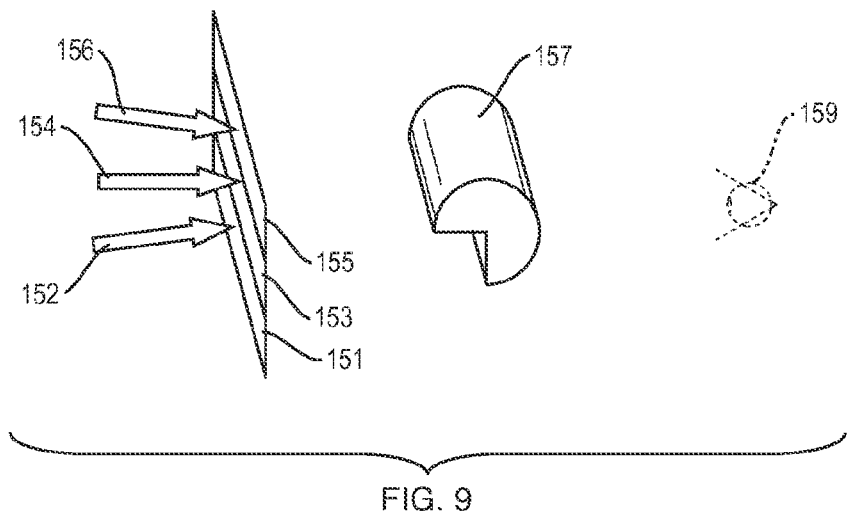
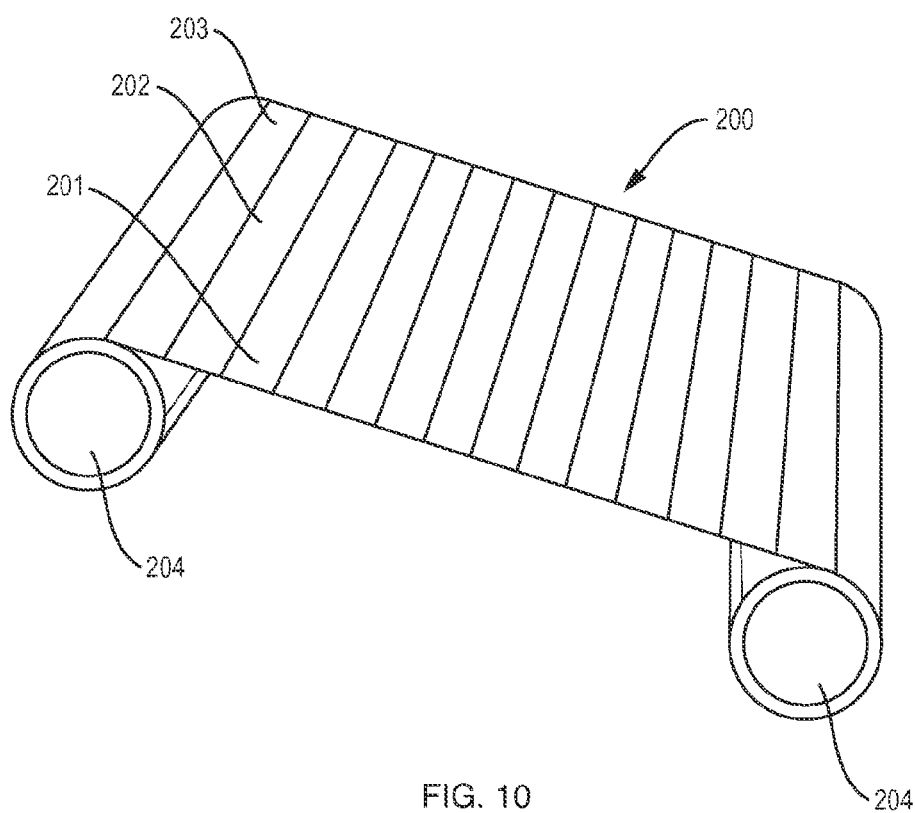

METHODS AND APPARATUS FOR HOLOGRAPHIC ANIMATION

RELATED APPLICATION

This application is a continuation-in-part of, and claims the benefit of the priority of the filing date of, U.S. patent application Ser. No. 12/871,041, filed Aug. 30, 2010, the entire disclosure of which is herein incorporated by reference.

FIELD OF THE TECHNOLOGY

The present invention relates generally to holograms.

SUMMARY OF THE INVENTION

First, a few definitions:
"H1" refers to a master hologram.
"H2" refers to a transfer hologram.
"HPO" means horizontal parallax only.
As used herein, "HPO stripe hologram" or "HPO stripe" means an HPO hologram recorded on a thin strip of a holographic plate or other holographic medium.

In an illustrative implementation of this invention, an animated holographic display is created as follows: multiple HPO stripes are recorded on an H2. These HPO stripes are aligned horizontally, and are vertically displaced from each other (analogous to how horizontal stripes on a flag are vertically displaced from each other). An animated real image is displayed by sequentially illuminating these HPO stripes.

In this illustrative implementation, the H2 plate is created by succession of HPO hologram transfers from H1 master holograms to an H2 transfer plate covered with a photosensitive emulsion. During the exposure of the first HPO stripe, an H1 is illuminated but only a horizontal stripe of the H2 transfer plate is exposed. On the next exposure an H1 is illuminated and the horizontal stripe above or below the first stripe is exposed on the H2. Each of the resulting HPO stripe holograms on the H2 may be thought of as a "frame" of the animation. By sequentially illuminating these "frames", an animated holographic display is created.

This approach would have the following problem (unless it were corrected): (a) the vertical perspectives of the HPO stripes of the scene being recorded would be different from HPO stripe to the next HPO stripe; because the HPO stripes are vertically displaced from each other; and (b) to a viewer watching the animated holographic display, objects in the displayed scene would appear to rotate vertically, due to the different vertical perspectives of the different HPO stripes. However, in illustrative implementations of this invention, this problem of unintended apparent vertical rotation of an animated object does not occur.

In illustrative implementations of this invention, this problem is solved as follows: the vertical perspective of the scene being recorded is identical from one HPO stripe exposure to the next, for at least some adjacent HPO stripes. The vertical may be made identical, from one HPO stripe exposure to the next, in at least three different ways. First, the content of H1 may be pre-rotated to make the vertical perspective of at least two adjacent HPO stripes identical. Second, H1 or H2 or both may be translated between exposures, in order to make the vertical perspective of at least two adjacent HPO stripes identical. These first two approaches allow the entire H1 to be illuminated during holographic transfer to the H2.

In contrast, the third solution involves illuminating a narrow horizontal stripe of H1 during holographic transfer. For example, the third solution may be implemented as follows: When exposing the HPO stripes on the H2, the entire H1 is not illuminated. Instead, only a horizontal stripe of the H1 is illuminated. A vertical diffuser is inserted between the H1 and H2. The stripe illumination of H1 allows only one vertical perspective to propagate and a diffuser allows that perspective to be seen from every vertical position on the H2. As a result, at least two adjacent HPO stripes have identical vertical perspectives of the scene being recorded.

Thus, each of the three solutions describe above has the following advantage: during sequential illumination of at least two adjacent HPO holograms (which have identical vertical perspectives), apparent vertical rotation of the animated holographic image as viewable by the human viewer does not occur.

In exemplary implementations of this invention, the HPO stripes on the H2 do not, collectively, comprise a set of stereoscopic pairs. (As used herein, a "stereoscopic pair" consists of a first HPO stripe and a second HPO stripe, the first and second HPO stripes in a stereoscopic pair having viewing zones horizontally displayed from each other such that the first and second HPO stripes are configured to produce a pair of images, one image in the image pair being viewable by the right eye of a human viewer and the other image in the image pair being viewable by the left eye of the human viewer.) For example, each of the three solutions described above may be implemented such that the HPO stripes on the H2 do not, collectively, comprise stereoscopic pairs.

BRIEF DESCRIPTION OF THE DRAWINGS

FIGS. 1 through 13 show illustrative implementations of this invention.

FIG. 1 is a diagram of an off-axis transmission hologram being captured by an H1 plate.

FIG. 2 is a diagram that shows holographic transfer from of a full aperture H1 plate to slit aperture H2 plate.

FIG. 3 is a diagram of a HPO hologram on an H2 plate being illuminated from behind in such a way as to display a real image to a viewer.

FIG. 4 is a diagram of a different HPO hologram on an H2 plate being illuminated from behind. By sequentially illuminating different HPO holograms on an H2 plate, different real images are rapidly displayed in sequence. To a viewer, it appears that the real image is animated.

FIG. 5 is a diagram of a source of monochromatic light, being moved to sequentially illuminate different HPO stripes.

FIG. 6 is a diagram of an array of sources of monochromatic light, that may be turned on and off to illuminate different HPO stripes.

FIG. 7 is a diagram that shows holographic transfer from H1 to H2, in which only a narrow stripe of H1 is illuminated.

FIG. 8 is a diagram that shows ways to correct vertical parallax rotation.

FIG. 9 is a diagram that shows multiple HPO stripes being illuminated at the same time to provide some vertical parallax.

FIG. 10 is a diagram of HPO stripes embossed on a foil H2 that runs on rollers.

FIG. 11 is a diagram that shows ways to control when slides change in a holographic slide show.

FIG. 12 is a diagram that shows multiple HPO stripes being illuminated to display multiple, independent real images.

FIG. 13 is a diagram that shows the use of a shutter.

DESCRIPTION OF THE INVENTION

In an illustrative implementation of this invention, an animated holographic image is created by sequentially illuminating different HPO stripes on an H2 plate. Each HPO stripe on H2 is created by holographic transfer from an H1 master hologram.

Figure 1:
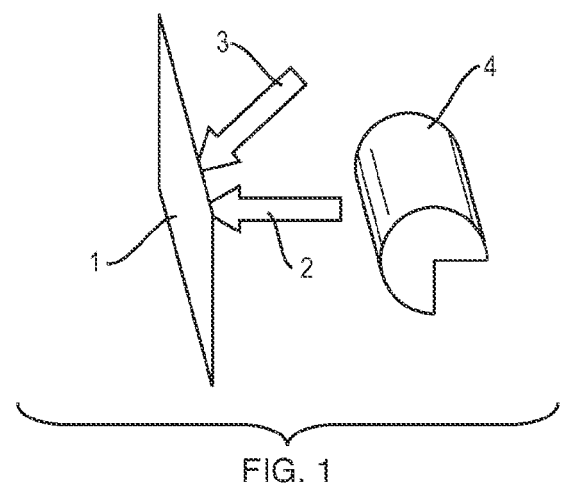

FIG. 1 is a diagram that shows the capture of an off-axis transmission hologram by an H1 plate, in an illustrative implementation of this invention. An H1 plate 1 is illuminated by an object beam 2 and a reference beam 3. The object beam 2 comprises diffusely reflected light from an object 4. The reference beam 3 is a uniform intensity beam. The reference beam and object beam overlap to form a holographic interference pattern that is recorded on the H1 plate.

Figure 2:
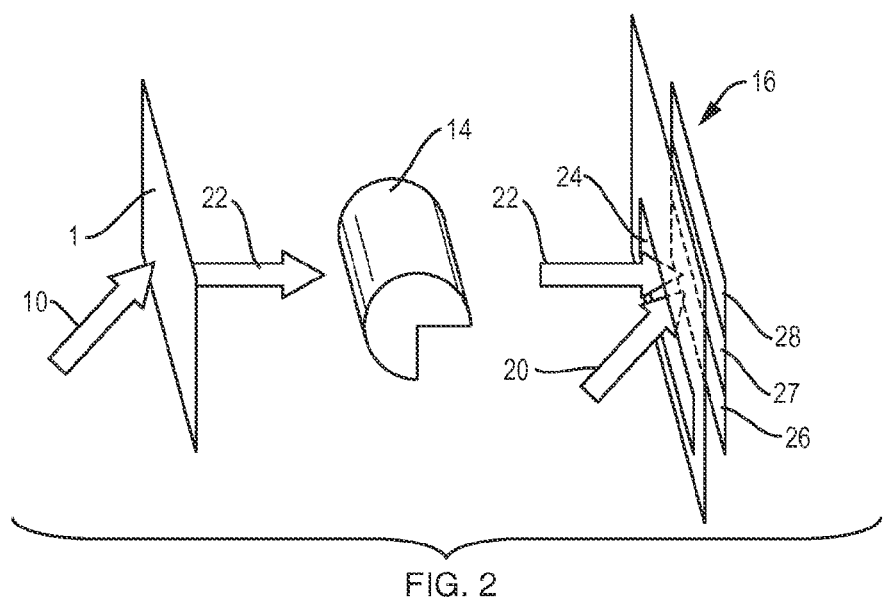

FIG. 2 is a diagram that shows holographic transfer from a full aperture H1 plate to a slit aperture H2 plate, in an embodiment of this invention. An illumination beam 10 illuminates an H1 plate 1 from behind at such an angle as to create a pseudoscopic real image 14 of the object 4. This real image 14 is a conjugate (or approximate conjugate) of the image of the object transmitted by the object beam 2.

In FIG. 2, the real image 14 is shown between H1 and H2. However, this invention may be implemented so that the real image 14 is in front of, straddling, or behind the H2 plate 16. In many cases, it is advantageous for the real image to straddle H2.

In the example shown in FIG. 2, the H2 plate is illuminated by a reference beam 20. The H2 plate is also illuminated by a beam 22 that exits the H1 plate and creates the real image 14. Beams 20 and 22 overlap, and the resulting holographic interference pattern is recorded on the H2 plate. However, beams 20 and 22 pass through a narrow horizontal slit 24 before illuminating H2, so that only a narrow horizontal strip of the H2 plate is exposed. This creates an HPO stripe hologram 26 (i.e., an HPO stripe) on the H2 plate.

In a working prototype of this invention, this slit 24 is 250 mm wide. However, the width of this slit may vary.

Note that, in the example shown in FIG. 2, the slit is between H1 and H2, and results in only a thin horizontal strip of H2 being exposed to create an HPO stripe. This differs from a conventional method of recording a "Benton" or "rainbow" hologram, in which the slit is located behind the H1 plate (rather than between the H1 and H2 plates), and the entire H2 is exposed to create an HPO hologram.

In exemplary embodiments of this invention, one or more sources of monochromatic light provide illumination, including for all object, reference and illumination beams. For example, in a working prototype of this invention, a red 632 nm HeNe laser is used to record (i.e., is used for object beam and reference beam) and a 532 nm green solid state laser is used to illuminate (i.e., is used for an illumination beam). The recording and illumination steps may be entirely independent. For example, the recording step may use one laser, three lasers (color) or no lasers (e.g., optical direct written, imprinted or etched hologram). Also, for example, the illumination step may employ one or more lasers of one or more wavelengths or suitably monochromatic LED or mercury lamp sources with monochromators subject to the limitations of chromatic blur.

A vertically multiplexed H2 plate may be created by a succession of HPO hologram transfers from one or more H1 holograms to the H2 plate. FIG. 2 shows an example of such a vertically multiplexed H2 plate. Each horizontal stripe in FIG. 2 represents a different HPO stripe hologram that is recorded on the H2 plate 16. These HPO stripes are displaced vertically from each other, as shown in FIG. 2. FIG. 2 shows only three different stripes 26, 27 and 28, representing three different HPO stripe holograms. In practice, however, the number of HPO stripes recorded on a single H2 may be far greater. For example, in a working prototype of this invention, approximately 40 HPO stripes may be recorded on a single H2 plate.

Each of the HPO stripes recorded on the H2 may be thought of as a "frame" of the animation. To create the appearance of movement, at least some of these "frames" differ from each other. That is, the content of at least some of the HPO stripes differs from the content of at least some others. To achieve this, different master H1 holograms may be used for different HPO hologram transfers. Or, a single H1 master hologram (of a single scene, that is not itself multiplexed) may be used for multiple HPO transfers, by re-illuminating the H1 from a different location or with a different wavelength to rotate, tilt shrink, or stretch an image of an object.

Figure 3:
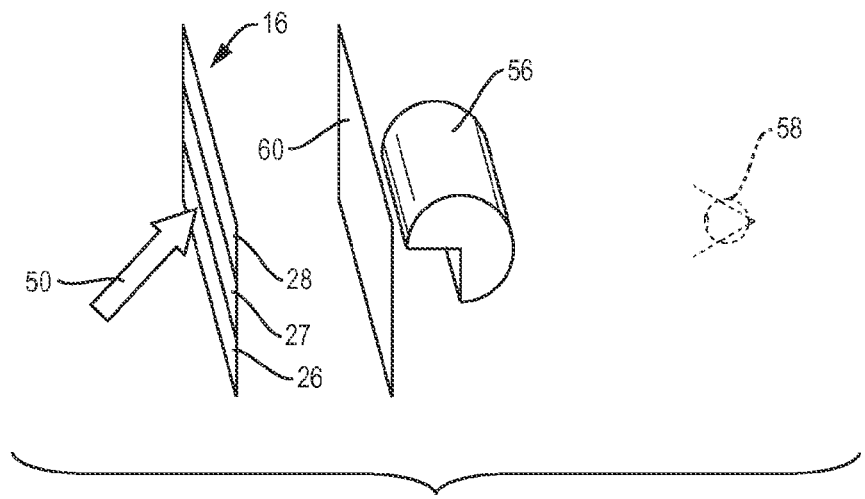

FIG. 3 is a diagram of a HPO stripe being illuminated to display a real image to a viewer, in an illustrative implementation of this invention. An illumination beam 50 illuminates an HPO stripe hologram 26 on an H2 plate 16 at such an angle as to create a real image 56 that can be seen by a human viewer 58. This real image 56 is an orthoscopic image of object 4 (since it is a pseudoscopic image of real image 14, which in turn is a pseudoscopic image of object 4). A vertical diffuser 60 is placed at, or near, the plane of the real image 56. The vertical diffuser 60 expands the vertical height of the view zone.

Figure 4:
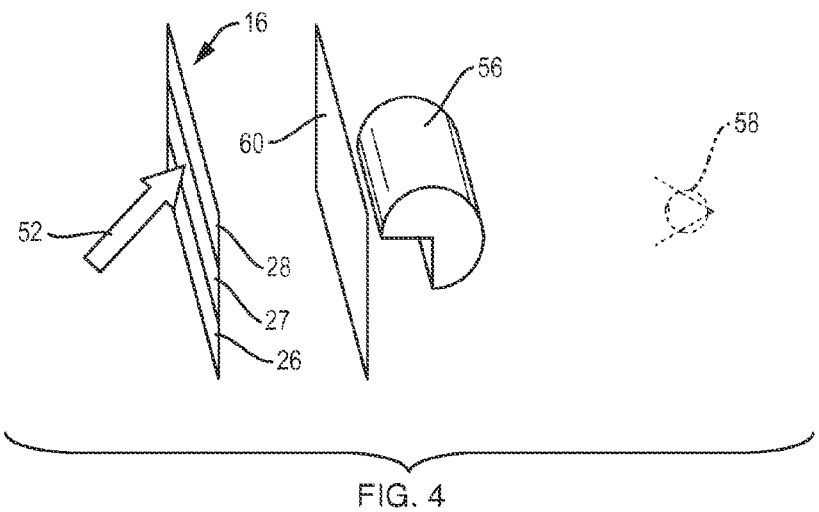

FIG. 4 is a diagram of a different HPO stripe hologram 27 on the same H2 plate 16 being illuminated to create a real image 56. This different HPO stripe is adjacent to the HPO stripe that was illuminated in FIG. 3.

According to principles of this invention, an animated hologram display may be created by sequentially illuminating different HPO stripes that are vertically multiplexed on an H2 plate. For example, first one HPO stripe may be illuminated, then the HPO stripe above or below it.

Figure 5:
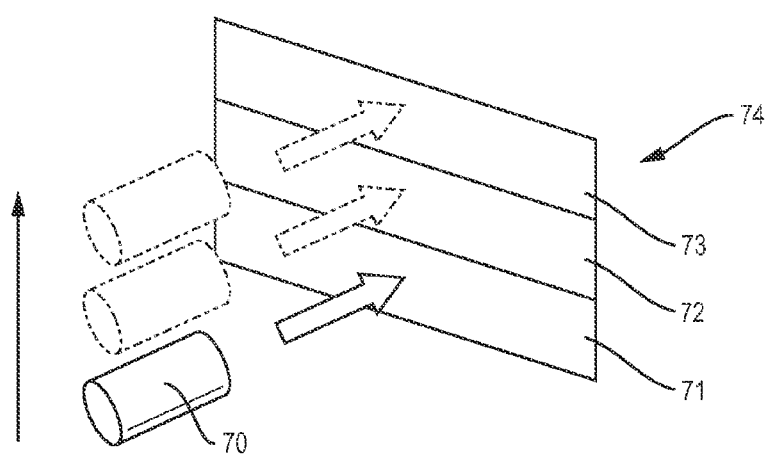
Figure 6:
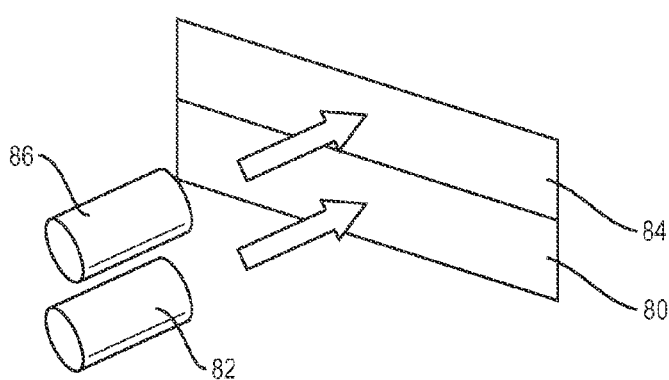

The sequential illumination may be achieved by translating a point source of monochromatic light. For example, as shown in FIG. 5, a point source of light 70 may be translated to illuminate different HPO stripe holograms 71, 72, 73 on an H2 plate. Alternately, a moving light source may be emulated by turning on and off light sources arranged in a row. For example, as shown in FIG. 6, an HPO stripe 80 on an H2 plate may be illuminated by turning on a monochromatic point light source 82, then a different HPO stripe 84 on the H2 plate may be illuminated by a different monochromatic light source 86.

In a working prototype of this invention, an array of lasers is employed. By turning on and off different lasers in this array, a moving light source is emulated.

This approach would have the following problem (unless it were corrected): (a) the vertical perspectives of the HPO stripes of the scene being recorded would be different from HPO stripe to the next HPO stripe; because the HPO stripes are vertically displaced from each other; and (b) to a viewer watching the animated holographic display, objects in the displayed scene would appear to rotate vertically, due to the different vertical perspectives of the different HPO stripes.

However, in illustrative implementations of this invention, this problem of unintended apparent vertical rotation of an animated object does not occur.

In illustrative implementations of this invention, this problem is solved as follows: the vertical perspective of the scene being recorded is identical from one HPO stripe exposure to the next, for at least some adjacent HPO stripes. The vertical may be made identical, from one HPO stripe exposure to the next, in at least three different ways. First, the content of H1 may be pre-rotated to make the vertical perspective of at least two adjacent HPO stripes identical. Second, H1 or H2 or both may be translated between exposures, in order to make the vertical perspective of at least two adjacent HPO stripes identical. These first two approaches allow the entire H1 to be illuminated during holographic transfer to the H2.

Figure 7:
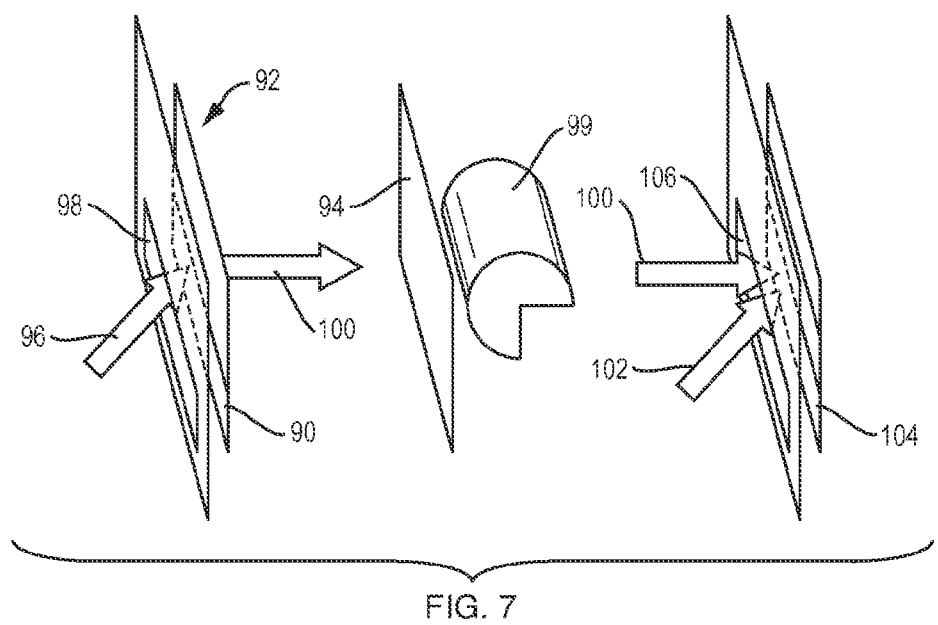

In contrast, the third solution involves illuminating only a thin stripe of H1 during holographic transfer. An example of this third solution is illustrated in FIG. 7. When exposing the HPO stripes on the H2, the entire H1 is not illuminated. Instead, only a horizontal stripe 90 of the H1 plate 92 is illuminated. The stripe illumination of H1 allows only one vertical perspective to propagate and a diffuser 94 allows that perspective to be seen from every vertical position on the H2. As a result, at least two adjacent HPO stripes have identical vertical perspectives of the scene being recorded. Advantageously, the addition of vertical diffuser 94 may improve the uniformity of the exposures and the total diffraction efficiency of the transfer holograms.

Thus, each of the three solutions describe above has the following advantage: during sequential illumination of at least two adjacent HPO holograms (which have identical vertical perspectives), apparent vertical rotation of the animated holographic image as viewable by the human viewer does not occur.

In exemplary implementations of this invention, the HPO stripes on the H2 do not, collectively, comprise a set of stereoscopic pairs. (As used herein, a "stereoscopic pair" consists of a first HPO stripe and a second HPO stripe, the first and second HPO stripes in a stereoscopic pair having viewing zones horizontally displayed from each other such that the first and second HPO stripes are configured to produce a pair of images, one image in the image pair being viewable by the right eye of a human viewer and the other image in the image pair being viewable by the left eye of the human viewer.) For example, each of the three solutions described above may be implemented such that the HPO stripes on the H2 do not, collectively, comprise stereoscopic pairs.

Of course, even if an HPO stripe lacks vertical parallax, it still has a vertical perspective on a scene that it records. For example, consider two HPO stripes, each of which lacks vertical parallax and each of which records the same scene. These two HPO stripes can have different vertical perspectives of the scene.

In the example shown in FIG. 7, the stripe illumination is achieved by passing the illumination beam 96 through a slit 98 that is so positioned as to produce the desired vertical perspective. The light that exits the horizontal stripe of the H1 forms a real image 99 that has no vertical parallax. In a working prototype of this invention, this slit 98 is 250 mm wide. However, the width of this slit may vary.

In the example shown in FIG. 7, the H2 plate is illuminated by a reference beam 102. The H2 plate is also illuminated by a beam 100 that exits the H1 plate and creates real image 99. Beams 100 and 102 overlap, and the resulting holographic interference pattern is recorded on the H2 plate. However, beams 100 and 102 pass through a narrow horizontal slit 106 before illuminating H2, so that only a narrow horizontal strip of the H2 plate is exposed. This creates an HPO stripe hologram 104 on the H2 plate.

Figure 8:
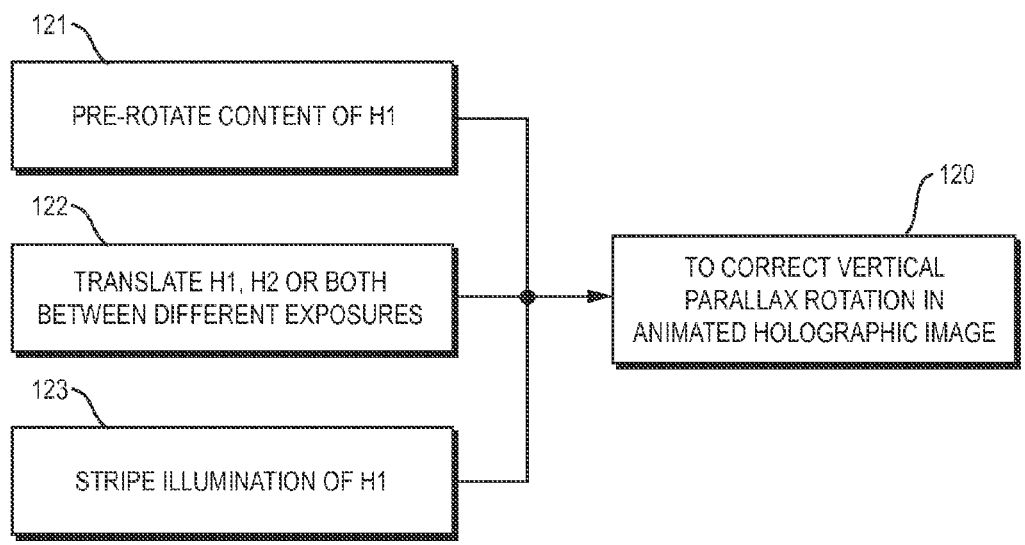

As shown in FIG. 8, the problem of vertical parallax rotation in an animated holographic image may be corrected 120 in at least these three ways: (a) the content recorded on H-1 may be pre-rotated 121, (b) H1, H2 or both may be translated between exposures of H2 122, and (c) only a narrow horizontal stripe of H1 may be illuminated when making a transfer hologram 123.

This invention may be implemented in such a way that waveguided illumination is used to reduce the length of the display casing.

Alternately, at least some adjacent HPO stripes may have different vertical perspectives on a scene that these HPO stripes record. These adjacent HPO stripes with different vertical perspectives may be illuminated simultaneously, in order to create vertical parallax.

This invention may be implemented in such a way that multiple HPO stripe holograms on the H2 plate are illuminated simultaneously to give multiple vertical views of the same object to provide some vertical parallax. FIG. 9 shows an example of this. Stripes 151, 153 and 155 on an H2 plate 106 are HPO stripe holograms. Each records a different vertical perspective of an object. These stripes are simultaneously illuminated by illumination beams 152, 154 and 156, respectively, to create a real image 157 with some vertical parallax. Thus, if a viewer 159 changes his or her vertical height, the vertical perspective of the image changes.

In an illustrative embodiment of this invention, H2 is an embossed pattern on foil that runs on rolls. Advantageously, this allows the duration of animation to be increased. FIG. 10 shows an example of H2 foil 200 with HPO stripe holograms 201, 202, 203 embossed on it. The foil 200 runs on rolls 204.

Figure 11:
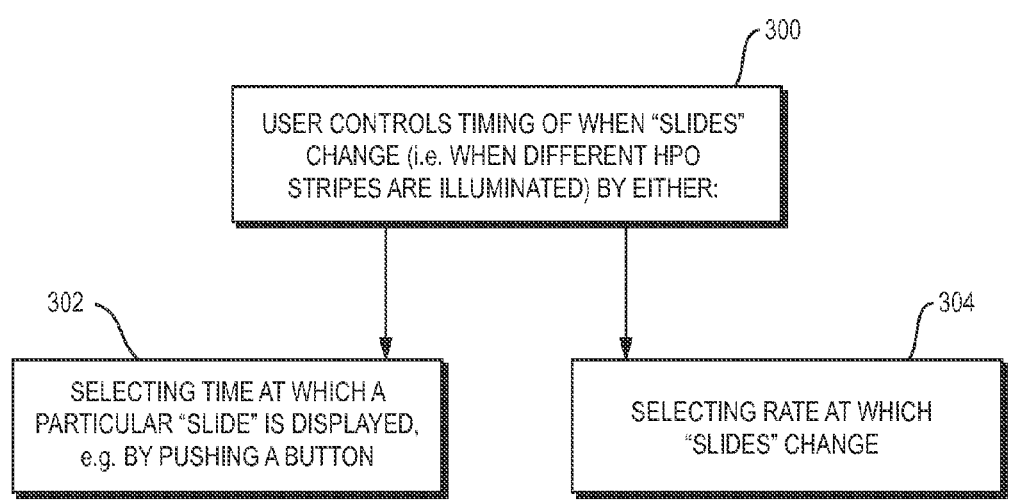

In some implementations, this invention may be used for a holographic slide show. For example, as shown in FIG. 11, a user may control the timing of when "slides" change (i.e., when different HPO stripes are illuminated) 300 in a holographic slide show 300. For example, a user may push a button or otherwise select the time at which to display a particular "slide" 302, or may instead select the rate at which the "slides" change 304.

Figure 12:
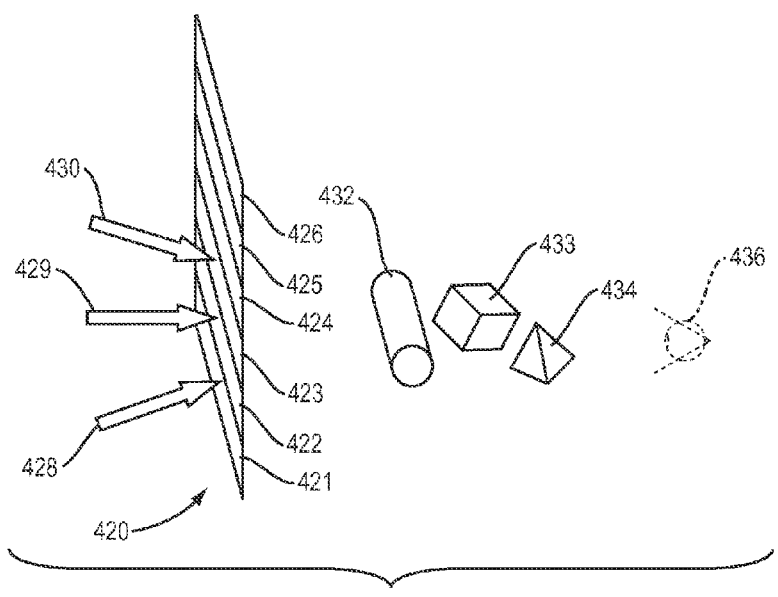

This invention may be implemented so as to permit the simultaneous display of multiple, independent, animated holographic objects. FIG. 12 shows an example of this. Stripes 421, 422 and 423 on an H2 plate 420 are HPO stripe holograms. Each records a different object. These stripes are simultaneously illuminated by illumination beams 428, 429 and 430, respectively, to create three different real images 433, 432 and 434, respectively. Each of these images is of a different object. In order to animate these images, HPO stripe holograms on the H2 may be sequentially illuminated. For example, HPO stripes 424, 425 and 426 may be illuminated next. The different objects may be recorded in different colors. For example, the viewer may see three objects: one red, one green and one blue. The fact that the objects are displayed independently is be useful, for example, in a game in which the action of each object changes as a result of user input.

Figure 13:
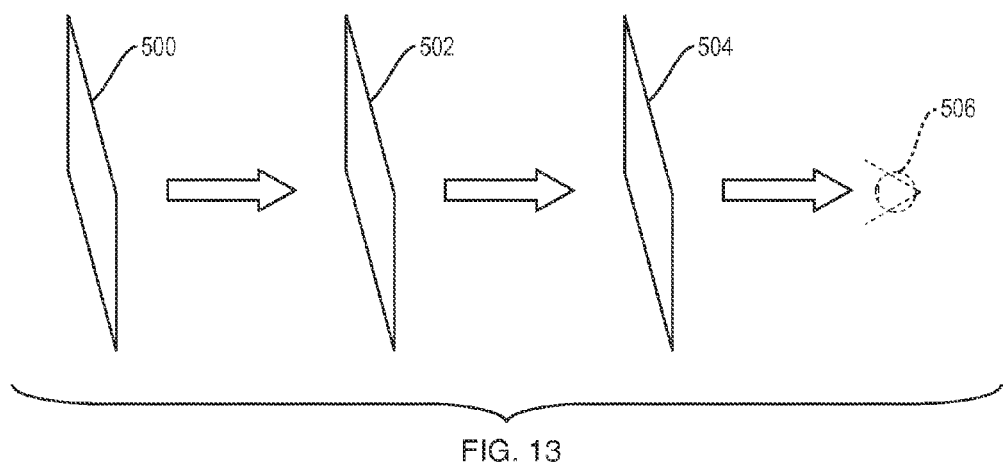

This invention may be implemented with an LCD shutter or ferroelectic shutter for creating real-time occlusion and other effects. As shown in FIG. 13, light from an H2 hologram 500 may pass through a shutter 502 and a vertical diffuser 504 before reaching a viewer 506.

Definitions and Clarifications:

Here are some definitions and clarifications.

The term "comprise" (and grammatical variations thereof) shall be construed broadly, as if followed by "without limitation". If A comprises B, then A includes B and may include other things.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

As used herein, the terms "horizontal" and "vertical" are construed broadly. They apply to any x y coordinate system where the so-called "horizontal" axis is perpendicular to the so-called "vertical" axis. For example, it may be convenient to take devices that are ordinarily upright, and lay them on their side on a table when creating H1 and H2 holograms. Also, note that the orientation of these so-called "horizontal" and "vertical" axes may change from one device to another, for example, if a mirror changes the direction of light traveling between two devices.

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

As used herein, the term "sequentially" (and its grammatical variations, such as "sequential"): (a) refers to any sequence, (b) is not limited to one at a time, but may refer to more than one at a time, and (c) does not necessarily mean in order, but may refer to a sequence that skips around, out of order.

Variations

This invention may be implemented in a variety of ways. Here are some examples:

This invention may be implemented as a method that comprises sequential illumination of a plurality of HPO holograms while displaying an animated holographic image of a scene to a human viewer, wherein: (a) the plurality of HPO holograms are in or on an H2 medium; (b) the plurality of HPO holograms are vertically displaced from each other; (c) prior to the sequential illumination, identical vertical perspectives of the scene have been recorded on at least two adjacent HPO holograms out of the plurality of HPO holograms; (d) during the sequential illumination of the at least two adjacent HPO holograms, apparent vertical rotation of the animated holographic image as viewable by the human viewer does not occur; and (e) the plurality of HPO holograms does not, collectively, comprise stereoscopic pairs. Furthermore: (1) the identical vertical perspectives may be achieved, at least in part, by pre-rotating the content of at least one H1 hologram; (2) the identical vertical perspectives may be achieved, at least in part, by translating an H1 master hologram, the H2 medium, or both, between exposures of different HPO holograms out of the plurality of HPO holograms; (3) the identical vertical perspectives may be achieved, at least in part, by illuminating a horizontal strip of an H1 master hologram during holographic transfer to the H2 medium, causing only a single vertical perspective to propagate from the H1 master hologram; (4) a vertical diffuser may be used to diffuse light that has been transmitted through an H1 before the light reaches the H2 medium; (5) a vertical diffuser may be used to diffuse light that has been transmitted through the H2 medium before the light is viewed by a viewer; (6) more than one HPO hologram, out of the plurality of HPO holograms, may be illuminated at the same time; (7) at least two HPO holograms, out of the plurality of HPO holograms, may have different vertical perspectives of the scene and may be illuminated at the same time; and (8) at least two HPO holograms, out of the plurality of HPO holograms, may have partially non-overlapping images and may be illuminated at the same time.

This invention may be implemented as a system comprising: (a) at least one H2 medium for recording, or on which are recorded, a plurality of HPO holograms vertically displaced from each other; and (b) a set of one or more monochromatic light sources, the set of light sources being configured to effect sequential illumination of a plurality of HPO holograms, which sequential illumination causes an animated image of a scene to be displayed to a human viewer during the sequential illumination; wherein (i) at least two adjacent HPO holograms, out of the plurality of HPO holograms, have vertical perspectives of the scene, which vertical perspectives are identical such that during the sequential illumination of the at least two adjacent HPO holograms, apparent vertical rotation of the animated holographic image as viewable by the human viewer does not occur; and (ii) the plurality of HPO holograms does not, collectively, comprise stereoscopic pairs. Furthermore: (1) the system may further comprise at least one actuator for translating the H2 medium or for translating at least one the light source, in each case during the sequential illumination; (2) at least two light sources, out of the set of light sources, may be configured for being turned on and off at different times to provide the sequential illumination; (3) the system may further comprise a vertical diffuser, the vertical diffuser being configured for diffusing light that exits at least one HPO hologram, out of the plurality of the HPO holograms, before the light reaches a viewer; (4) at least some HPO holograms, out of the plurality of HPO holograms, may be embossed; (4) at least one light source, out of the set of light sources, may be configured to illuminate more than one HPO hologram, out of the plurality of HPO holograms, at a time; (5) the system may further comprise a light source and a slit, the light source and slit being configured for illuminating a horizontal strip of an H1 master hologram during hologram transfer to the H2 medium, in such a way that only a single vertical perspective propagates from the H1 master hologram; and (6) the system of claim 16 may further comprise a vertical diffuser, the vertical diffuser being configured for diffusing light that has been transmitted through the H1 master hologram before the light reaches the H2 medium, which light, immediately before it reaches the vertical diffuser, has only a single vertical perspective of the scene.

This invention may be implemented as a method comprising the following steps, in combination: (a) recording a plurality of HPO holograms on an H2 medium by a process that comprises, for each HPO hologram out of the plurality of HPO holograms, the steps of: (i) transmitting light through a horizontal stripe of an H1 hologram, (ii) diffusing the light with a vertical diffuser before it reaches the H2 medium, (iii) exposing a horizontal strip of the H2 medium to the light and to a reference beam, and (iv) recording on the H2 medium an interference pattern formed by the light and the reference beam; and (b) sequentially illuminating the plurality of HPO holograms when displaying an animated image of a scene to a human viewer; wherein (i) during the recording, at least two adjacent HPO holograms, out of the plurality of HPO holograms, record the same vertical perspective of the scene, (ii) during the sequential illumination of the at least two adjacent HPO holograms, apparent vertical rotation of the animated holographic image as viewable by the human viewer does not occur; and (iii) the plurality of HPO holograms does not, collectively, comprise stereoscopic pairs. The method may further comprise the step of vertically diffusing light from the plurality of HPO holograms, before the light from the plurality of HPO holograms reaches the viewer.

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method that comprises passing an illumination beam through each hologram, respectively, in a plurality of horizontal-parallax-only (HPO) holograms, such that different holograms in the plurality are illuminated at different times, and such that the holograms display an animated movie of a scene, wherein:
   (a) the holograms are vertically displaced from each other on a hologram recording medium; and
   (b) a first hologram, out of the plurality of HPO holograms, displays a first image that shows a first vertical perspective on the scene, which first vertical perspective is the vertical angle from which the scene appears, in the first image, to be shown;
   (c) a second hologram, out of the plurality of HPO holograms, displays a second image that shows a second vertical perspective on the scene, which second vertical perspective is the vertical angle from which the scene appears, in the second image, to be shown; and
   (d) the first and second vertical perspectives are identical to each other, even though content of the first image differs from content of the second image in at least some respects other than vertical perspective.

2. The method of claim 1, wherein:
   (a) the method further comprises recording the plurality of HPO holograms by transfer from a master hologram; and
   (b) the identical vertical perspectives are achieved, at least in part, by rotating content of the master hologram.

3. The method of claim 1, wherein:
   (a) the method further comprises recording the plurality of HPO holograms by transfer from a master hologram; and
   (b) the identical vertical perspectives are achieved, at least in part, by translating the master hologram, the medium, or both, between exposures of different holograms out of the plurality of HPO holograms.

4. The method of claim 1, wherein:
   (a) the method further comprises recording the plurality of HPO holograms by transfer from a master hologram; and
   (b) the identical perspectives are achieved, at least in part, by illuminating a horizontal strip of the master hologram during the transfer to the medium.

5. The method of claim 4, wherein a vertical diffuser is used to diffuse light that has been transmitted through the master hologram before the light reaches the medium.

6. The method of claim 1, wherein a vertical diffuser diffuses light that has been transmitted through the medium before the light is viewed by a viewer.

7. The method of claim 1, wherein more than one hologram, out of the plurality of HPO holograms, is illuminated at the same time to produce an image that has vertical parallax.

8. The method of claim 1, wherein different content in different holograms, out of the plurality of HPO holograms, creates an appearance of movement in the animated image.

9. A system comprising:
   (a) at least one medium for recording, or on which are recorded, a plurality of horizontal-parallax-only (HPO) holograms that are vertically displaced from each other on the medium; and
   (b) a set of one or more monochromatic light sources, the set of light sources being configured to sequentially illuminate of the plurality of HPO holograms, such that:
      (i) the HPO holograms display an animated movie of a scene;
      (ii) a first hologram, out of the plurality of HPO holograms, displays a first image that shows a first vertical perspective on the scene, which first vertical perspective is the vertical angle from which the scene appears, in the first image, to be shown;
      (iii) a second hologram, out of the plurality of HPO holograms, displays a second image that shows a second vertical perspective on the scene, which second vertical perspective is the vertical angle from which the scene appears, in the second image, to be shown; and
      (iv) the first and second vertical perspectives are identical to each other, even though content of the first image differs from content of the second image in at least some respects other than vertical perspective.

10. The system of claim 9, further comprising at least one actuator for translating the medium or for translating at least one the light source, in each case during the sequential illumination.

11. The system of claim 9, further comprising a vertical diffuser, the vertical diffuser being configured for diffusing light that exits at least one hologram, out of the plurality of the (HPO) holograms, before the light reaches a viewer.

12. The system of claim 9, wherein at least some holograms, out of the plurality of (HPO) holograms, are embossed.

13. The system of claim 9, wherein at least one light source, out of the set of light sources, is configured to illuminate more than one hologram, out of the plurality of (HPO) holograms, at a time.

14. The system of claim 9, further comprising a light source and a slit, the light source and slit being configured for illuminating a horizontal strip of a master hologram during hologram transfer to the medium.

15. The system of claim 14, further comprising a vertical diffuser, the vertical diffuser being configured for diffusing light that has been transmitted through the master hologram before the light reaches the medium.

16. The system of claim 9, wherein different content in different holograms, out of the plurality of HPO holograms, creates an appearance of movement in the animated image.

17. A method comprising recording a plurality of horizontal-parallax-only (HPO) holograms on a medium by a process that comprises, for each hologram out of the plurality of HPO holograms, the steps of:
(a) transmitting light through a horizontal stripe of a master hologram;
(b) diffusing the light with a vertical diffuser before it reaches the medium;
(c) exposing a horizontal strip of the medium to the light and to a reference beam; and
(d) recording on the medium an interference pattern formed by the light and the reference beam;
wherein the plurality of (HPO) holograms is recorded such that:
(i) the plurality of HPO holograms is configured to display, when sequentially illuminated, an animated movie of a scene,
(ii) a first hologram, out of the plurality of HPO holograms, records a first vertical perspective on the scene,
(iii) a second hologram, out of the plurality of HPO holograms, records a second vertical perspective on the scene,
(iv) the first and second vertical perspectives are identical to each other, even though content of the first hologram differs from content of the second hologram in at least some respects other than vertical perspective,
(v) the first and second vertical perspectives are the vertical angle from which the scene would appear to be shown in a holographic image displayed by the first and second holograms, respectively, and
(vi) the HPO holograms are vertically displaced from each other on the medium.

18. The method of claim 17, wherein the plurality of holograms does not, collectively, comprise stereoscopic pairs.

19. The method of claim 17, wherein different content in different holograms, out of the plurality of (HPO) holograms, creates an appearance of movement in the animated image.

* * * * *